(12) United States Patent
Muffoletto

(10) Patent No.: US 10,020,127 B1
(45) Date of Patent: Jul. 10, 2018

(54) CAPACITOR HAVING MULTIPLE ANODES HOUSED IN A COMPARTMENTED CASING

(71) Applicant: Greatbatch Ltd., Clarence, NY (US)

(72) Inventor: Mark T. Muffoletto, Darien Center, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 15/479,573

(22) Filed: Apr. 5, 2017

(51) Int. Cl.
*H01G 11/80* (2013.01)
*H01G 11/46* (2013.01)
*H01G 11/52* (2013.01)

(52) U.S. Cl.
CPC ............ *H01G 11/80* (2013.01); *H01G 11/46* (2013.01); *H01G 11/52* (2013.01)

(58) Field of Classification Search
None
See application file for complete search history.

(56) References Cited

U.S. PATENT DOCUMENTS

| | | | | |
|---|---|---|---|---|
| 5,227,960 A * | 7/1993 | Kunishi | ............... | H01G 9/155 361/502 |
| 5,926,362 A | 7/1999 | Muffoletto et al. | | |
| 6,334,879 B1 | 1/2002 | Muffoletto et al. | | |
| 6,377,441 B1 * | 4/2002 | Ohya | ..................... | H01G 9/155 361/502 |
| 6,392,868 B2 * | 5/2002 | Ohya | ..................... | H01G 11/74 29/25.03 |
| 6,493,209 B1 * | 12/2002 | Kamath | ................ | H01G 9/155 361/502 |
| 6,850,405 B1 | 2/2005 | Stemen et al. | | |
| 7,072,171 B1 | 7/2006 | Muffoletto et al. | | |
| 7,483,260 B2 * | 1/2009 | Ziarniak | ................ | H01G 4/35 29/25.03 |
| 8,027,149 B2 | 9/2011 | Hahl et al. | | |
| 9,721,730 B1 * | 8/2017 | Muffoletto | ............. | H01G 9/08 |
| 9,824,829 B1 * | 11/2017 | Muffoletto | ............. | H01G 11/80 |
| 9,875,855 B2 * | 1/2018 | Perez | ..................... | H01G 11/52 |
| 2005/0243501 A1 * | 11/2005 | Muffoletto | ............. | H01G 9/06 361/534 |

(Continued)

*Primary Examiner* — Dion R Ferguson
(74) *Attorney, Agent, or Firm* — Michael F. Scalise

(57) ABSTRACT

A capacitor is described. A casing for the capacitor has a surrounding sidewall extending to opposed first and second open ends. An inwardly extending ledge of the sidewall is intermediate the first and second open ends. A partition plate is supported on the ledge. A first lid is secured to the first annular edge to close the first capacitor compartment bounded by the partition plate, the surrounding sidewall and the first lid, and a second lid is secured to the second annular edge to close the second capacitor compartment bounded by the opposite side of the partition plate, the surrounding sidewall and the second lid. At least one anode resides in each of the first and second capacitor compartments spaced from cathode active material supported on the casing walls facing the anodes. There is also a separator intermediate the anode and cathode. Insulative seals supported by the casing electrically isolate anode leads connected to the respective anodes from the casing serving as a terminal for the cathode. Finally, a working electrolyte is provided in the first and second capacitor compartments in contact with the anodes and cathode active material.

17 Claims, 4 Drawing Sheets

(56) References Cited

U.S. PATENT DOCUMENTS

| | | | | |
|---|---|---|---|---|
| 2008/0171259 A1* | 7/2008 | Kanai | ..................... | H01G 9/016 |
| | | | | 429/53 |
| 2012/0092808 A1* | 4/2012 | Kim | ....................... | H01G 11/12 |
| | | | | 361/502 |
| 2013/0141841 A1* | 6/2013 | Dreissig | ................. | H01G 9/035 |
| | | | | 361/505 |
| 2017/0125178 A1* | 5/2017 | Perez | ..................... | H01G 11/80 |

* cited by examiner

CAPACITOR HAVING MULTIPLE ANODES HOUSED IN A COMPARTMENTED CASING

FIELD OF THE INVENTION

The present invention relates to capacitors, more particularly, to a casing structure designed to house at least two anodes for an electrolytic capacitor.

SUMMARY OF THE INVENTION

As more and more medical applications are investigated and implemented to aid and assist the human body, devices needed to deliver the desired therapy are becoming increasingly more sophisticated, both functionally and in terms of their structural makeup. Modern implantable devices require power sources that are relatively small in size, but powerful enough to meet the therapy requirements. For example, a cardiac defibrillator has a battery powering circuits performing such functions as, for example, the heart sensing and pacing functions. This requires electrical current of about 1 microampere to about 100 milliamperes. From time-to-time, the cardiac defibrillator may require a generally high rate, pulse discharge component that occurs, for example, during charging of a capacitor assembly in the defibrillator for the purpose of delivering an electrical shock to the heart. The electrical shock is for the purpose of treating a tachyarrhythmia, the irregular, rapid heartbeats that can be fatal if left uncorrected. Treating a tachyarrhythmia requires electrical current of about 1 ampere to about 4 amperes to be drawn from the battery to sufficiently charge the capacitor assembly.

The current trend in medicine is to make cardiac defibrillators, and like implantable devices, as small and lightweight as possible without compromising their power. This, in turn, means that the components within the capacitor, particularly the anode, need to be constructed to optimum energy density and volumetric efficiency parameters.

The present invention is, therefore, directed to a novel casing design for a capacitor. The capacitor casing houses at least two anodes in a volumetrically efficient design comprising a surrounding sidewall extending to opposed open ends. The sidewall is provided with at least one inwardly extending ledge, which can be annularly endless or discontinuous at spaced locations around an inner perimeter of the sidewall. The ledge supports a partition plate which delineates first and second capacitor compartments, each for housing an anode and associated cathode active material therein. Cover lids close the opposed ends of the sidewall to thereby close the capacitor compartments. If desired, the sidewall is provided with additional inwardly extending ledges supporting respective partition plates to provide as many capacitor compartments for housing anode/cathode active material assemblies as needed for a particular application.

The cathode active material is, for example, ruthenium oxide while the anode typically comprises an anode active material such as tantalum, aluminum, or niobium. There is also a separator intermediate the anode and cathode in both of the first and second capacitor compartments.

Electrical connection to the capacitor is made through respective first and second insulative seals supported by the sidewall on opposite sides of the partition plate. The insulative seals electrically insulate a respective first lead for the first anode housed in the first capacitor compartment and a second lead for the second anode housed in the second capacitor compartment from the casing serving as a terminal for the cathode active material. Finally, a working electrolyte is provided in the first and second capacitor compartments in contact with the first and second anodes and the cathode active material.

Thus, the present capacitor embodiments provide the designer with form factors that are readily adaptable for powering modern implantable medical devices.

These and other objects of the present invention will become increasingly more apparent to those skilled in the art by reference to the following detailed description and the appended drawings.

DETAILED DESCRIPTION OF THE PREFERRED EMBODIMENTS

Figure 1:
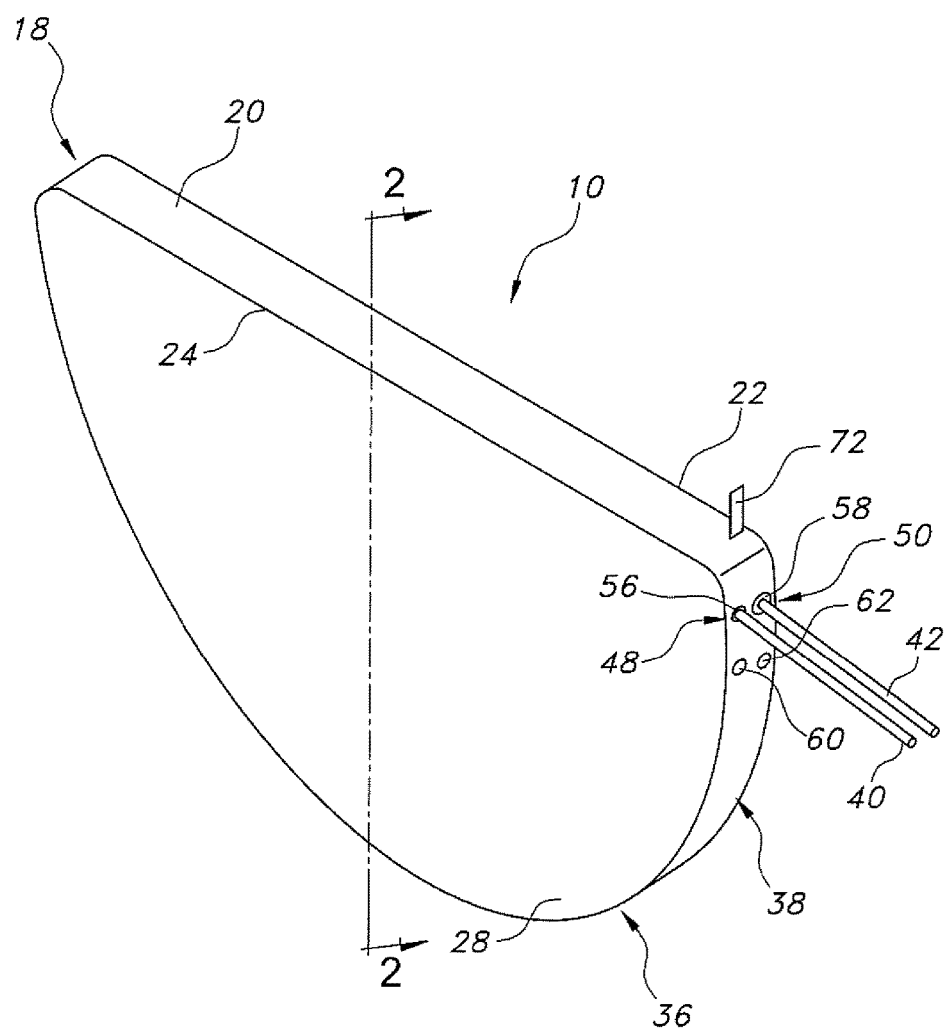
FIG. 1 is a perspective view of an exemplary capacitor 10 according to the present invention.
Figure 2:
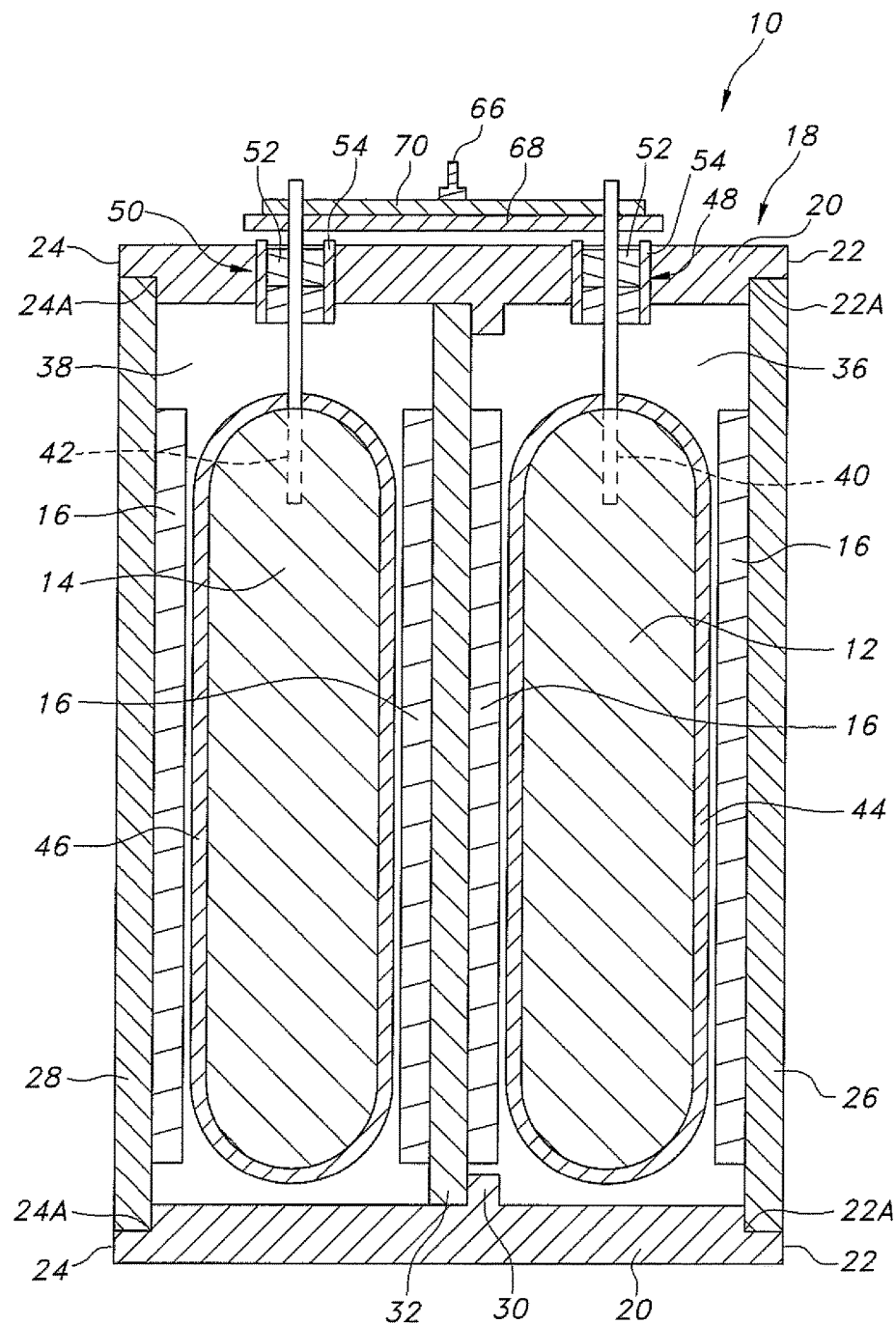
FIG. 2 is a cross-sectional view taken along line 2-2 of FIG. 1 illustrating a dual anode design with each anode housed in a respective capacitor compartment.

Referring now to the drawings, an exemplary capacitor 10 according to the present invention is illustrated in FIGS. 1 and 2. As will be described in detail hereinafter, capacitor 10 is well suited for implantable cardiac device capacitor applications and comprises a first anode 12 of a first anode active material, a second anode 14 of a second anode active material, and a cathode of a cathode active material 16, all housed inside a hermetically sealed casing 18. Preferably, the side-by-side first and second anodes 12, 14 are of the same active material. The capacitor 10 can be of either an electrochemical type with the anode and the cathode being provided by conductive substrates having a capacitive material contacted thereto or, an electrolytic type with the cathode being provided by a conductive substrate having capacitive properties and the anode being of a valve metal. The illustrated capacitor 10 is preferably of the latter type, however, that should not be construed as limiting. The capacitor electrodes are operatively associated with each other by a working electrolyte (not shown) contained inside the casing 18.

Casing 18 is preferably formed using an extrusion process, for example extruded titanium, or a 3D printing process, for example 3D printed titanium. In an extrusion process the casing material is pushed through a die of the desired cross-section, which is advantageous because the casing metal only encounters compressive and shear stresses, but with excellent surface finish. In a 3D printing process, also known as additive manufacturing (AM), the three-dimensional casing sidewall 20 is formed from successive layers of material under computer control. Other suitable methods for forming casing sidewall 20 include stamping, extruding, metal injection molding, or machining from a block of suitable metal.

Figure 3A:
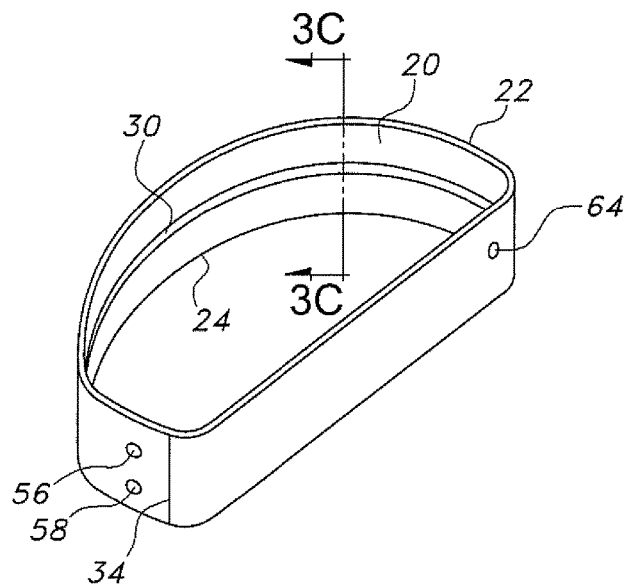
FIG. 3A is a perspective view of a casing sidewall 20 for the capacitor 10 illustrated in FIGS. 1 and 2.
Figure 3B:
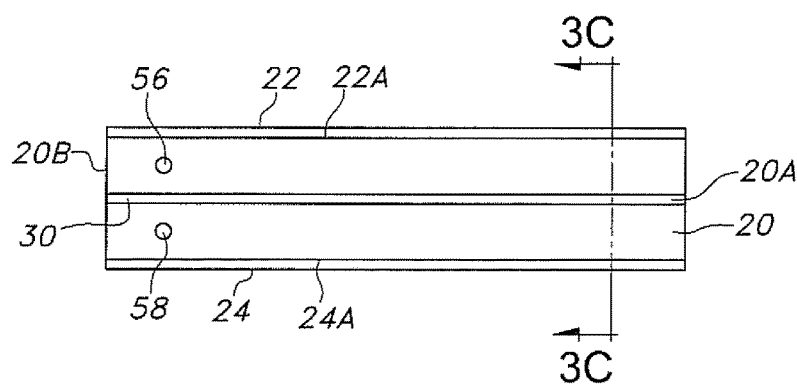
FIG. 3B is a side elevational view of the casing sidewall 20 prior to being formed into the surrounding or endless shape shown in FIG. 3A.
Figure 3C:
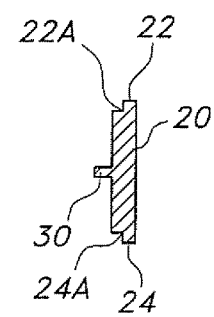
FIG. 3C is a cross-sectional view taken along line 3C-3C of FIG. 3B.

FIGS. 3A and 3B illustrate side elevation and cross-section views, respectively, of a casing sidewall 20 piece provided with opposed ends 20A and 20B. To form the shaped sidewall, the extruded or 3D printed piece is manipulated to meet the ends 20A, 20B together at a seam 34 (FIG. 3A) where they are secured to each other, for example by welding, and preferably by laser welding.

Regardless the process used for its manufacture, the surrounding casing sidewall 20 is, for example, a cylindrically-shaped or prismatic-shaped sidewall, extending to first and second edges 22, 24 defining opposed open ends. An inwardly facing annular step 22A is provided at the first edge 22. Similarly, an inwardly facing annular step 24A is provided at the second edge 24. The steps 22A, 24A are each of a depth to receive respective plate-shaped members 26, 28 serving as opposed first and second lids that are sized and shaped to close the opposed open ends of the surrounding sidewall 20. That way, the steps 22A, 24A are sized so that an outer surface of the plate-shaped lids 26, 28 is aligned with the respective first and second edges 22, 24 of the sidewall 20. Cathode active material 16 is contacted to the inner surface of the lids 22, 24.

The surrounding sidewall 20 is provided with an inwardly extending ledge 30, preferably as an integral extension of the sidewall. The ledge 30 resides about mid-way along the length of sidewall 20 taken from the first edge 22 to the second edge 24, and is preferably an endless annular structure. Alternatively, the ledge 30 is provided at spaced locations around the annular extent of the surrounding sidewall 20. In any event, the inwardly extending ledge 30 supports a partition plate 32 secured thereto, for example by welding, and preferably by laser welding. Cathode active material 16 is supported on the opposed major sides of the partition plate 32. While not shown in the drawing, the partition plate 32 is preferably perforated where it supports the cathode active material.

Once the partition plate 32 supporting the cathode active material 16 is secured to the ledge 30 supported by the surrounding sidewall 20, first and second anode 12 and 14, both preferably formed as a pressed valve metal pellet, preferably of tantalum, that has been sintered, anodized and subjected to a formation protocol, are housed therein. In particular, the first anode 12 is housed in an open-ended first compartment 36 delineated by the partition plate 32 and a first portion of the sidewall 20. The second anode 14 is housed in an open-ended second compartment 38 delineated by the partition plate 32 and a second portion of the sidewall 20. The casing 18 is completed with the first lid 26 supporting cathode active material 16 fitted into the step 22A to thereby close the first compartment 36. The second lid 28 supporting cathode active material 16 is fitted into the step 24A to thereby close the second compartment 38. Preferably, the various coatings of cathode active material 16 are substantially aligned in a face-to-face relationship with the major faces of the anodes 12, 14.

In that manner, the casing 18 provides the first capacitor compartment 36 delineated as the area bounded by the surrounding sidewall 20, partition plate 32 and lid 26, and the second capacitor compartment 38 delineated as the area bounded by the surround sidewall 20, partition plate 32 and lid 28. Preferably the first and second lids 26, 28 are plate-shaped members that are aligned about parallel to each other.

While titanium is preferred, the sidewall 20, lids 26, 28, and partition plate 32 can also be made of a conductive metal selected from the group consisting of tantalum, nickel, niobium, stainless steel, aluminum, zirconium, and mixtures and alloys thereof. Regardless the metal, the sidewall 20, lids 26, 28, and partition plate 32 each have a thickness of about 0.015 to about 0.5 millimeters and when assembled together as the casing 18 serve as one terminal or contact for making electrical connection between the capacitor 10 and its load.

The cathode active material 16 is contacted to an inner surface of the lid 26 of the container 18. Cathode active material 16 is also supported on the opposed first and second major surfaces of the partition plate 32 (the first surface facing the lid 26 and the second surface facing the opposite direction). Prior to securing the partition plate 32 to the ledge 30, the first anode 12 in the form of a pressed valve metal pellet, preferably of tantalum, that has been sintered, anodized and subjected to a formation protocol, is housed in the open-ended first capacitor compartment 36. When so housed, the anode 12 is adjacent to, but spaced from the cathode active material 16 coating the first major surface of the partition plate 32. The lid 26 is then secured to the step 22A to close the first capacitor compartment 36. While not shown in the drawings, the partition plate 32 is preferably perforated where it supports cathode active material 16.

The second anode 14 in the form of a pressed valve metal pellet, preferably of tantalum, that has been sintered, anodized and subjected to a formation protocol, is next housed in the open-ended second capacitor compartment 38. When so housed, the anode 14 is adjacent to, but spaced from the cathode active material 16 coating the second major surface of the partition plate 32. With cathode active material 16 coating an inner surface of the lid 28, this lid is then secured to the step 24A to close the second capacitor compartment 38. Preferably, the various coatings of cathode active material 16 are substantially aligned in a face-to-face relationship with the major faces of the anodes 12, 14.

The active material of the anodes 12 and 14 is typically of a metal in the form of a pellet. The anode metal is selected from the group of valve metals consisting of tantalum, aluminum, titanium, niobium, zirconium, hafnium, silicon, germanium, and mixtures thereof. As is well known by those skilled in the art, the anode metal in powdered form, for example tantalum powder, is compressed into a pellet having an anode lead (lead 40 for anode 12 and lead 42 for anode 14) embedded therein and extending there from, and sintered under a vacuum at high temperatures. The porous body is then anodized in a suitable electrolyte to fill its pores with electrolyte and form a continuous dielectric oxide film on the sintered body. A preferred tantalum material and method of manufacturing an anode pellet for the present capacitor 10 is described in U.S. Pat. No. 9,312,075 to Liu et al., which is assigned to the assignee of the present invention and incorporated herein by reference.

In particular, the anode pellets 12, 14 and their leads 40, 42 are anodized by immersing the pellet/lead assembly in an electrolyte and applying a current. The anodizing electrolyte includes constituents such as water and phosphoric acid and perhaps other organic solvents. The application of current drives the formation of an oxide film that is proportional in thickness to the targeted forming voltage. A pulsed formation process may be used where current is cyclically applied and removed to allow diffusion of heated electrolyte from the internal pores of the anode. Intermediate washing and annealing steps may be performed to facilitate formation of a stable, defect free oxide. Preferably, the leads 40, 42 are of the same material as the anodes 12, 14, and the anode pellet/lead assembly is anodized to a formation voltage that is greater than zero up to 550 V.

Preferably the various cathode active material 16 coatings (contacting the inner surface of lid 26, both major sides or surfaces of the partition plate 32, and the inner surface of lid 28) have a thickness of about a few hundred Angstroms to about 0.1 millimeters. Alternatively, the cathode active material 16 is coated on a conductive substrate (not shown) in electrical contact with the inner surface of lid 26, both major sides or surfaces of the partition plate 32, and the inner surface of lid 28. In any event, the cathode active material 16 is preferably spaced from the surrounding sidewall 20.

In that respect, the lids 26, 28 and partition plate 32, may be of an anodized-etched conductive material, have a sintered active material with or without oxide contacted thereto, or they may be contacted with a double layer capacitive material, for example a finely divided carbonaceous material such as graphite, carbon, activated carbon, platinum black, a redox, pseudocapacitive or an under potential material, or they may be an electroactive conducting polymer such as polyaniline, polypyrrole, polythiophene, and polyacetylene, and mixtures thereof.

According to one preferred aspect of the present invention, the redox or cathode active material 16 includes an oxide of a first metal, the nitride of the first metal, the carbon nitride of the first metal, and/or the carbide of the first metal, the oxide, nitride, carbon nitride, and carbide having pseudocapacitive properties. The first metal is preferably selected from the group consisting of ruthenium, cobalt, manganese, tantalum, iron, niobium, iridium, titanium, zirconium, hafnium, rhodium, vanadium, osmium, palladium, and platinum.

The cathode active material 16 may also include a second or more metals. The second metal is in the form of an oxide, a nitride, a carbon nitride or carbide, and is not essential to the intended use of the conductive lids 26, 28 and partition plate 32 as a capacitor electrode. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the present invention, the cathode active material 16 includes an oxide of ruthenium and is substantially devoid of the second or more metals.

The cathode active material 16 may also be selected from graphitic or glassy carbon on titanium carbide, carbon and silver vanadium oxide on titanium carbide, carbon and crystalline manganese dioxide on titanium carbide, platinum on titanium, ruthenium on titanium, barium titanate on titanium, carbon and crystalline ruthenium oxide on titanium carbide, carbon and crystalline iridium oxide on titanium carbide, silver vanadium oxide on titanium, and activated carbon.

As disclosed in U.S. Pat. No. 7,116,547 to Seitz et al., a preferred cathode material coating process is by pad printing. An ultrasonically generated aerosol, as described in U.S. Pat. Nos. 5,894,403, 5,920,455, 6,224,985, and 6,468,605, all to Shah et al., is also suitable for making a coating of the cathode active material 16. In that manner, the ultrasonically generated cathode active material contacted to the conductive inner surface of lid 26, both major conductive surfaces of the partition plate 32 and the conductive inner surface of lid 28 has a majority of its particles with diameters of less than about 10 microns. This provides an internal surface area for the active material of about 10 $m^2$/gram to about 1,500 $m^2$/gram. The Shah et al. '403, '455, '985 and '605 patents and the Seitz et al. '347 patent are assigned to the assignee of the present invention and incorporated herein by reference.

As shown in FIG. 2, to prevent an internal electrical short circuit between the electrodes, a first separator envelope 44 of electrically insulative material surrounds the first anode 12 and a second separator envelope 46 of electrically insulative material surrounds the second anode 14. The separator envelopes 44, 46 prevent direct physical contact of the respective anodes 12, 14 with the facing cathode active materials 16 while allowing for ionic transport during charging and discharging of the capacitor 10. The respective separator envelopes 44, 46 are of materials that are chemically unreactive with the anode and cathode active materials and both chemically unreactive with and insoluble in the electrolyte.

Illustrative separator materials include woven and non-woven fabrics of polyolefinic fibers including polypropylene and polyethylene, or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLUPOR®, (DMS Solutech); a polytetrafluoroethylene membrane commercially available under the designation ZITEX®, (Chemplast Inc.) or EXCELLERATOR®, (W.L. Gore and Associates); a polypropylene membrane commercially available under the designation CELGARD®, (Celgard LLC); and a membrane commercially available under the designation DEXIGLAS®, (C. H. Dexter, Div., Dexter Corp.). Cellulose based separators also typically used in capacitors are contemplated by the scope of the present invention. Depending on the working electrolyte, the material used for the envelopes 44, 46 can be treated to improve its wettability, for example with a surfactant, as is well known by those skilled in the art. The working electrolyte will be described in detail hereinafter, The capacitor 10 illustrated in FIGS. 1 and 2 further includes an insulator and seal structure, for example a glass-to-metal seal, for each of the anodes 12, 14 and their leads 40, 42. The respective insulator and seal structures are designated 48 and 50 in the drawings. As is well known to those skilled in the art, the insulator and seal structures 48 and 50 comprise an insulative glass 52 that provides a hermetic seal between the inside of a ferrule 54 supported by the casing sidewall 20 and the anode leads 40, 42. The ferrules 54 for the respective insulator and seal structures 48, 50 are configured for mounting in a suitably sized openings 56, 58 (FIG. 3B) in the casing sidewall 20. Alternatively, the ferrule 54 comprising at least one of the insulator and seal structures 48 and 50 is supported in the adjacent lid 26, 28. The insulative glass 52 is, for example, ELAN® type 88 or MANSOL™ type 88. In that manner, those portions of the anode leads 40, 42 extending outside the casing 18 are hermetically sealed from the interior thereof to electrically isolate the leads from the first and second capacitor compartments 36, 38 comprising the casing 18, which casing serves as the terminal for the cathode electrode.

Alternatively, the insulator and seal structures 48, 50 do not have glass isolating the leads 40, 42 from the respective ferrules 54. Instead, the insulative material 52 is a synthetic elastomeric material that is configured to seal between anode leads 40, 42 and their ferrules 54. A suitable synthetic elastomeric material is, for example, Master-Sil 151 made by Master Bond. While such a seal structure using only a synthetic polymeric material is not necessarily hermetic, acceptable isolation of the working electrolyte from inside the first and second capacitor compartments 36, 38 to the outside the casing 18 is provided.

To complete the capacitor 10, a working electrolyte (not shown) is filled into the first and second capacitor compartments 36, 38 to contact the anode 12, 14 and cathode active materials 16. A suitable working electrolyte for the capacitor 10 is described in U.S. Pat. No. 6,219,222 to Shah et al., which includes a mixed solvent of water and ethylene glycol having an ammonium salt dissolved therein. U.S. Patent Pub. Nos. 2003/0090857 and 2003/0142464 describe other working electrolytes for the present capacitor 10. The working electrolyte of the former publication comprises water, a water-soluble inorganic and/or organic acid and/or salt, and a water-soluble nitro-aromatic compound while the latter relates to a working electrolyte having de-ionized water, an organic solvent, isobutyric acid and a concentrated ammonium salt. These publications and patent are assigned to the assignee of the present invention and incorporated herein by reference.

Regardless its constituents, the working electrolyte is provided inside the hermetically sealed capacitor compartments 36, 38 through respective fill openings, each opening closed by a hermetic closure 60 and 62 (FIG. 1), as is well known by those skilled in the art. Alternatively, FIG. 3A shows a single fill opening 64 which is applicable when the partition plate 32 is perforated to allow electrolyte to flow between the respective casing compartments 36, 38.

As shown in FIG. 1, the anode leads 40, 42 for capacitor 10 are unconnected from each other so that the respective anodes 12, 14 can be charged independently. This could take the form of charging one of the anodes partially or completely to a rated voltage, and then charging the other anode. In other situations, it might be preferred to charge one anode at a rate different than that at which the other anode is charged. For example, a pulse current could charge one of the anodes while the other is done by constant power charging. An advantage of separately connecting the anode leads 40, 42 to an external charging circuit is that charging and discharging currents can be distributed over the anodes 12, 14, which allows smaller, more flexible leads 40, 42 and connections than one lead with an equivalent current carrying capacity.

Alternatively, FIG. 2 illustrates that the anodes 12, 14 can be connected to a common polarity terminal. In that manner, the respective anode leads 40, 42 are electrically connected to a common positive polarity terminal 66. This is accomplished by first mounting an insulator 68 having spaced apart openings sized to receive the leads 40, 42. A bridge 70 of conductive material, for example, nickel, is then supported on the insulator 68. The bridge 70, which has a pair of openings that receive the anode leads 40, 42, is secured to these leads by respective welds, preferably by laser welds (not shown), to electrically connect the leads together in parallel. Finally, the common positive terminal 66 is electrically connected to bridge 70. The bridge 70 can also be crimped onto the leads 40, 42 by applying a force that deforms the bridge from opposed directions.

In use, the capacitor 10 is connected to a load (not shown) as a power source. That can be done by either connecting the leads 40, 42 or the negative polarity terminal pin 66 to the load. A common positive terminal pin 72 (FIG. 1) connected to the casing 18 is also connected to the load to complete the electrical connection.

While not shown in the drawings, a molded polymeric cradle or restraint is preferably provided for containing the anodes 12, 14 in the desired position inside the capacitor compartments 36, 38 should the capacitor 10 experience high shock and vibration conditions. Suitable restraints are described in U.S. Pat. No. 7,085,126 to Muffoletto et al. and U.S. Pat. No. 7,092,242 to Gloss et al., which are assigned to the assignee of the present invention and incorporated herein by reference.

Figure 4:
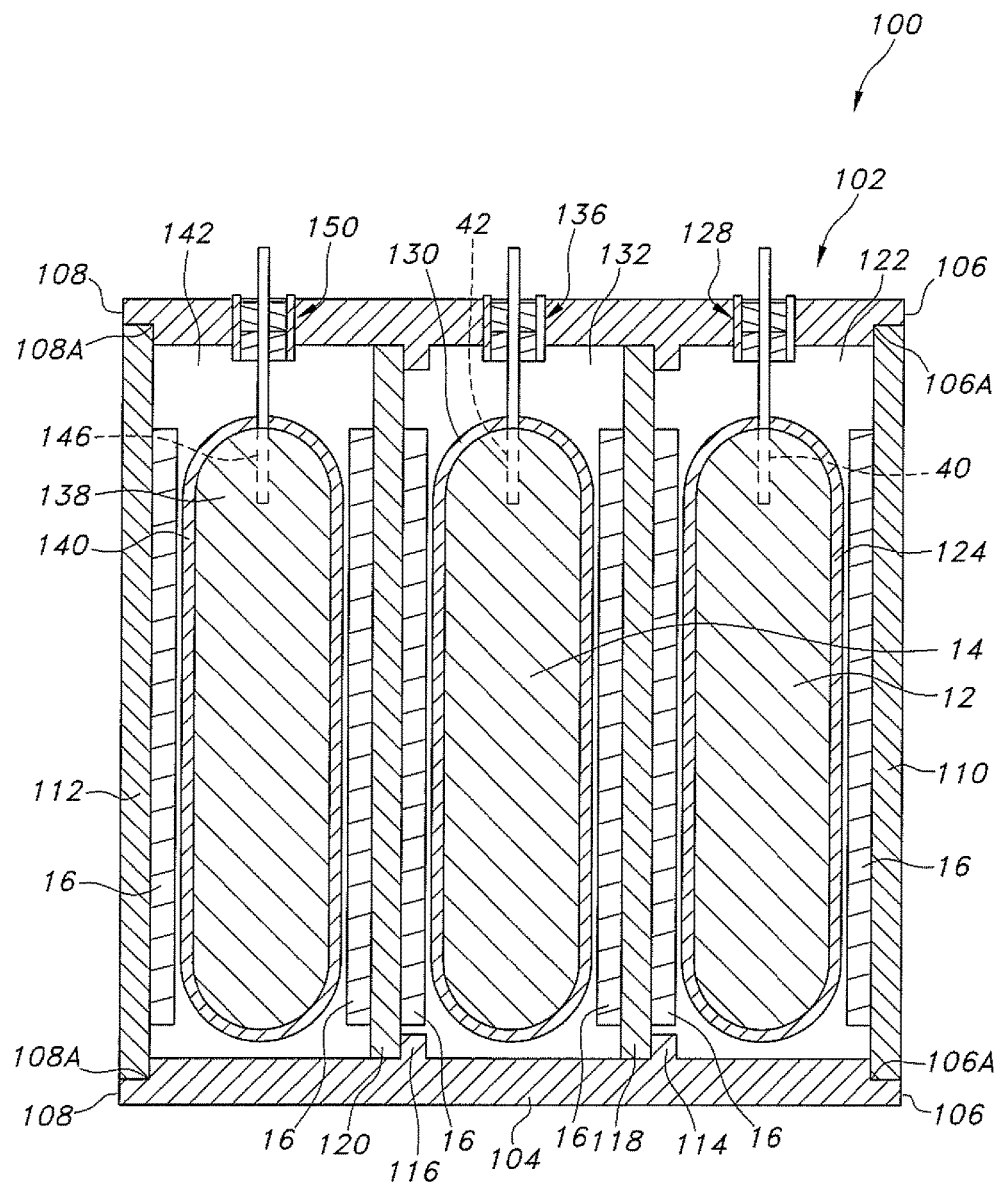
FIG. 4 is a partially broken-away view illustrating another embodiment for a three anode capacitor 100 according to the present invention.

It should be understood that the capacitor 10 of the present invention is not limited to dual anode designs. FIG. 4 is a cross-sectional view of another embodiment of a capacitor 100 according to the present invention. Capacitor 100 has a casing 102 of a metal material, the casing comprising a cylindrically-shaped or prismatic-shaped sidewall 104 extending to first and second edges 106, 108 defining opposed open ends. An inwardly facing annular step 106A is provided at the first edge 106. Similarly, an inwardly facing annular step 108A is provided at the second edge 108. The steps 106A, 108A are each of a depth to receive respective plate-shaped members 110, 112 serving as opposed first and second lids that are sized and shaped to close the opposed open ends of the surrounding sidewall 104. That way, the steps 106A, 108A are sized so that an outer surface of the plate-shaped lids 110, 112 are aligned with the respective first and second edges 106, 108 of the sidewall 104. Cathode active material 16 is contacted to the inner surface of the lids 106, 108.

The surrounding sidewall 104 is provided with a first inwardly extending ledge 114 about one-third along its length from the first edge 106 to the second edge 108 and a second inwardly extending ledge 116 about two-third along the sidewall length. The ledges 114, 116 are endless annular structures. Alternatively, the ledges 114, 116 are provided at spaced locations around the annular extent of the surrounding sidewall 104. In any event, the inwardly extending ledges 114, 116 support respective partition plates 118, 120 secured thereto, for example by welding, and preferably by laser welding. Cathode active material 16 is supported on the opposed major sides or surfaces of the partition plates 118, 120. While not shown in the drawing, the partition plates 118, 120 are preferably perforated where they support the cathode active material.

An exemplary method for building the capacitor 100 according to the present invention begins with one of the partition plates, for example partition plate 118 being secure to its ledge 114 by any suitable means such as welding, and preferably by laser welding. Cathode active material 16 is supported on the opposed major surfaces of partition plate 118. Once partition plate supporting cathode active material 16 is secured in place, the first anode 12, which is contained in separator envelope 124, and is preferably formed as a pressed valve metal pellet of tantalum that has been sintered, anodized and subjected to a formation protocol, is housed in the first capacitor compartment 122. The first compartment 122 is delineated by the partition plate 118, a first portion of the sidewall 104 adjacent to step 106A, and lid 110 seated in that step. Further, the first anode 12 is provided with an embedded lead 40 that is electrically isolated from the equipotential casing 102 by insulator and seal structure 128.

The second anode 14 contained in separator envelope 130 is then housed in a second compartment 132 delineated by the partition plate 118, the middle portion of the sidewall 104, and partition plate 120. Cathode active material 16 is supported on the opposed major surfaces of partition plate 120. Second anode 14 is provided with an embedded lead 42 that is electrically isolated from the equipotential casing 102 by insulator and seal structure 136.

A third anode 138 contained in separator envelope 140 is then housed in a third compartment 132 delineated by the partition plate 120, a third portion of the sidewall 104 adjacent to step 108A, and lid 112 seated in that step. Cathode active material 16 is supported on the inner major surface of lid 112. The third anode 138 is provided with an embedded lead 146 that is electrically isolated from the equipotential casing 102 by insulator and seal structure 150.

Preferably, the various coatings of cathode active material 16 are substantially aligned in a face-to-face relationship with the major faces of the anodes 12, 14 and 138.

The insulator and seal structures 128, 136 and 150 can be hermetic glass-to-metal seals or they can comprise a synthetic elastomeric material that is configured to seal between feedthrough leads 40, 42 and 146 and the respective ferrules comprising the seal structures. If desired, the ferrule comprising at least one of the insulator and seal structures 128 and 150 can be supported in the adjacent lid 110, 112. In any event, the ferrule for insulator and seal structure 136 is supported by the sidewall 104.

Further, a working electrolyte (not shown) is provided in the various capacitor compartments 122, 132 and 142 to contact the cathode active material, which is preferably ruthenium oxide, and the anode material, which is preferably tantalum.

Finally, FIG. 4 illustrates that the respective anode leads 40, 42 and 146 are unconnected to each other. However, that is by way of example only. If desired, these leads can be electrically connected in parallel as described for leads 40, 42 with respect to FIG. 2.

Moreover, while the capacitor 100 embodiment shown in FIG. 4 has three capacitor compartments 122, 132 and 142, that is by way of example only. Those skilled in the art will readily understand that a fourth, fifth and more capacitor compartments, each housing a respective anode and cathode can be provided in the casing 102. The number of capacitor compartments is only limited by the particular application in which the capacitor is intended to be used as a power source.

Although several embodiments of the invention have been described in detail, for purposes of illustration, various modifications of each may be made without departing from the spirit and scope of the invention. Accordingly, the invention is not to be limited, except as by the appended claims.

What is claimed is:

1. A capacitor, which comprises:
   a) a casing, comprising:
      i) a container comprising a surrounding sidewall extending to opposed first and second annular edges defining first and second open ends, wherein an inwardly extending ledge of the sidewall is located intermediate the first and second open ends;
      ii) a partition plate supported on the ledge, wherein the partition plate comprises opposed first and second major surfaces;
      iii) a first lid secured to the first annular edge to close the first open end of the container and thusly provide a first capacitor compartment bounded by the first major surface of the partition plate, the surrounding sidewall and the first lid; and
      iv) a second lid secured to the second annular edge to close the second open end of the container and thusly provide a second capacitor compartment bounded by the second major surface of the partition plate, the surrounding sidewall and the second lid; and
   b) a cathode active material residing in electrical contact with:
      i) at least one of the first lid and the first major surface of the partition plate inside the first capacitor compartment; and
      ii) at least one of the second lid and the second major surface of the partition plate inside the second capacitor compartment; and
   c) at least one anode residing in each of the first and second capacitor compartments and facing the cathode active material;
   d) a separator intermediate the anode and cathode in both of the first and second capacitor compartments;
   e) a first insulative seal supported by the casing to electrically isolate a first lead connected to the first anode housed in the first capacitor compartment from the casing;
   f) a second insulative seal supported by the casing to electrically isolate a second lead connected to the second anode housed in the second capacitor compartment from the casing, the casing serving as a terminal for the cathode active material in the first and second capacitor compartments; and
   g) a working electrolyte provided in the first and second capacitor compartments in contact with the first and second anodes and the cathode active material.

2. The capacitor of claim 1, wherein the inwardly extending ledge is either an endless annular protrusion or, discontinuous, residing at spaced locations around an inner perimeter of the surrounding sidewall of the container.

3. The capacitor of claim 1, wherein the inwardly extending ledge is an integral extension of the surrounding sidewall of the container.

4. The capacitor of claim 1, wherein the first and second insulative seals comprise respective first and second ferrules supported by the surrounding sidewall of the container.

5. The capacitor of claim 4, wherein at least one of the first and second ferrules supports a sealing glass contacting at least one of the first and second anode leads.

6. The capacitor of claim 4, wherein at least one of the first and second ferrules supports a polymeric material, but not a sealing glass, contacting at least one of the first and second anode leads.

7. The capacitor of claim 1, wherein the first and second lids are planar, plate shaped members aligned substantially parallel to each other.

8. The capacitor of claim 1, wherein at least one of the first and second annular edges comprises a step that receives the respective first and second lid.

9. The capacitor of claim 1, wherein the first and second anodes are sintered tantalum pellets that are characterized as having been anodized to a formation voltage that is greater than zero up to 550 V.

10. The capacitor of claim 1, wherein the cathode active material is selected from the group consisting of ruthenium, cobalt, manganese, molybdenum, tungsten, tantalum, iron, niobium, iridium, titanium, zirconium, hafnium, rhodium, vanadium, osmium, palladium platinum, nickel, lead, gold, silver, cobalt, and mixtures thereof.

11. The capacitor of claim 1, wherein the anode is selected from the group consisting of tantalum, aluminum, titanium, niobium, zirconium, hafnium, silicon, germanium, and mixtures thereof.

12. The capacitor of claim 1, wherein the first anode in the first capacitor compartment is intermediate and facing the cathode active material contacted to an inner surface of the first lid and the first major surface of the partition plate, and wherein the second anode in the second capacitor compartment is intermediate and facing the cathode active material contacted to the second major surface of the partition plate and an inner surface of the second lid.

13. The capacitor of claim 1, wherein the first and second anodes are electrically connected in parallel outside the casing.

14. The capacitor of claim 1, wherein the first and second anodes are not electrically connected to each other.

15. A capacitor, which comprises:
   a) a casing, comprising:
      i) a container comprising a surrounding sidewall extending to opposed first and second annular edges defining first and second open ends, wherein spaced apart first and second inwardly extending ledges of the sidewall are located intermediate the first and second open ends;
      ii) a first partition plate supported on the first ledge, wherein the first partition plate comprises opposed first and second major surfaces;
      iii) a second partition plate supported on the second ledge, wherein the second partition plate comprises opposed third and fourth major surfaces;
      iv) a first lid secured to the first annular edge to close the first open end of the container and thusly provide a first capacitor compartment bounded by the first major surface of the first partition plate, the surrounding sidewall and the first lid; and
      v) a second lid secured to the second annular edge to close the second open end of the container and thusly provide a second capacitor compartment bounded by the fourth major surface of the second partition plate, the surrounding sidewall and the second lid; and
      vi) a third capacitor compartment bounded by the second major surface of the first partition plate, the surrounding sidewall and the third major surface of the second partition plate; and
   b) a cathode active material residing in electrical contact with:
      i) at least one of the first lid and the first major surface of the first partition plate inside the first capacitor compartment;
      ii) at least one of the second lid and the fourth major surface of the second partition plate inside the second capacitor compartment; and
      iii) at least one of the second and third major surfaces of the respective first and second partition plates inside the third capacitor compartment; and
   c) at least one anode residing in each of the first, second and third capacitor compartments and facing the cathode active material;
   d) a separator intermediate the anode and cathode in each of the first, second and third capacitor compartments;
   e) a first insulative seal supported by the casing to electrically isolate a first lead connected to the first anode housed in the first capacitor compartment from the casing;
   f) a second insulative seal supported by the casing to electrically isolate a second lead connected to the second anode housed in the second capacitor compartment from the casing;
   g) a third insulative seal supported by the casing to electrically isolate a third lead connected to the third anode housed in the third capacitor compartment from the casing, the casing serving as a terminal for the cathode active material in the first, second and third capacitor compartments; and
   h) a working electrolyte provided in the first, second and third capacitor compartments in contact with the first, second and third anodes and the cathode active material.

16. The capacitor of claim 15, wherein the first and second ledges are individually either an endless annular ledge or, discontinuous, residing at spaced locations around an inner perimeter of the surrounding sidewall of the container.

17. The capacitor of claim 15, wherein the first, second and third anodes are comprised of tantalum and the cathode active material is comprised of ruthenium oxide.

* * * * *